United States Patent [19]
Morgan et al.

[11] Patent Number: 5,370,023
[45] Date of Patent: Dec. 6, 1994

[54] CUTTING TOOL FOR TURNING PARALLEL GROOVES

[75] Inventors: Ricky D. Morgan, Milan; Phillip D. Wurzler, Laceyville; Walter J. Zatkos, Jr., Towanda, all of Pa.

[73] Assignee: GTE Products Corporation, Danvers, Mass.

[21] Appl. No.: 179,541

[22] Filed: Jan. 10, 1994

Related U.S. Application Data

[63] Continuation of Ser. No. 942,257, Sep. 9, 1992, abandoned.

[51] Int. Cl.⁵ .................... B23B 27/06; B23B 27/08
[52] U.S. Cl. .............................. 82/158; 407/69; 407/70; 407/112
[58] Field of Search ............ 82/158; 407/67, 69, 407/70, 101, 102, 107, 112, 117, 119

[56] References Cited

U.S. PATENT DOCUMENTS

| | | | |
|---|---|---|---|
| 1,248,201 | 11/1917 | Swahlstedt | 407/67 |
| 1,298,201 | 3/1919 | Hacker | 407/67 X |
| 1,307,633 | 6/1919 | Midgley et al. | 407/67 X |
| 1,342,031 | 6/1920 | Skibinski | 407/67 |
| 4,573,832 | 3/1986 | Zinner | 407/70 |
| 5,205,678 | 4/1993 | Britsch et al. | 407/69 X |

FOREIGN PATENT DOCUMENTS

| | | | |
|---|---|---|---|
| 2149624 | 4/1973 | Germany | 407/67 |

*Primary Examiner*—William E. Terrell
*Attorney, Agent, or Firm*—Elizabeth A. Levy; Robert F. Clark

[57] ABSTRACT

A cutting tool for simultaneously forming a plurality of deep, narrow, closely spaced parallel grooves in a hard, brittle substrate material comprises a rigid housing which defines a plurality of closely spaced cutting blade cavities, each of said cavities being constructed to receive and rigidly hold a cutting blade therein, and cutting blades rigidly mounted in each of said cavities.

3 Claims, 4 Drawing Sheets

CUTTING TOOL FOR TURNING PARALLEL GROOVES

This is a continuation of copending application Ser. No. 07/942,257, filed on Sep. 9, 1992 abandoned.

CROSS REFERENCE TO RELATED APPLICATIONS

This application is related to Attorney's Docket No. 922169, Cutting Tool Having A Plurality of Cutting Blades, filed concurrently herewith and claiming related subject matter.

1. Technical Field

This invention relates to cutting tools and methods for machining hard, brittle materials and more particularly to cutting tools and methods for simultaneously forming a plurality of deep, narrow, closely spaced parallel grooves or slots in such hard, brittle materials.

2. Background Art

Multiple deep, narrow, closely spaced parallel grooves have been formed in hard or brittle materials which are difficult to machine by machining a single groove at a time with a single point cutting tool and then filling that groove with a removable material to provide support for the web of material which is formed between the grooves during the machining of the next parallel groove. This process is repeated for the number of grooves desired. "Deep" and "narrow" grooves are defined as having a depth of at least eight times their width. "Closely spaced" grooves are defined as being separated by a maximum distance of one-half inch. A "single point" cutting tool is defined as having a single cutting blade to engage the workpiece.

Another method for machining multiple deep, narrow, closely spaced parallel grooves in hard, brittle materials involves the removal of small amounts of material from each groove with a single point cutting tool, thereby minimizing the unsupported web area of material between the grooves as they are formed.

Both of these methods are painstaking, time-consuming and inefficient. When deep, narrow, closely spaced grooves are machined into hard, brittle materials, the web of material between them often warps or breaks to relieve stresses in the material generated during the machining process. Thus, the potential for producing scrap is high when machining such deep, narrow, closely spaced grooves in hard, brittle materials. Also, the cutting tools required to machine such hard, brittle materials are themselves hard and brittle, and tool breakage due to vibration during the machining process is exacerbated if the tools are not rigidly mounted.

SUMMARY OF THE INVENTION

It is, therefore, an object of this invention to obviate the disadvantages of the prior art.

It is another object of the invention to enhance cutting tools and methods for machining hard, brittle materials.

It is yet another object of the invention to provide a cutting tool and a method for simultaneously forming multiple deep, narrow, closely spaced parallel grooves or slots in hard or brittle materials which are difficult to machine.

These objects are accomplished, in one aspect of the invention, by a cutting tool which comprises a plurality of separable housing portions which, when rigidly joined, define a plurality of closely spaced cutting blade cavities, means for rigidly joining said separable housing portions, means for mounting a cutting blade in each of the cavities, and a cutting blade mounted rigidly in each of the cavities.

It will be seen that the rigidity of the housing which holds the multiple cutting blades, and the rigidity with which each cutting blade is fixed in its cavity, prevent breakage or distortion of the thin web of material which remains between the grooves thus formed.

BEST MODE FOR CARRYING OUT THE INVENTION

For a better understanding of the present invention, together with other and further objects, advantages and capabilities thereof, reference is made to the following specification and appended claims, taken in conjunction with the above described drawings.

Figure 1:
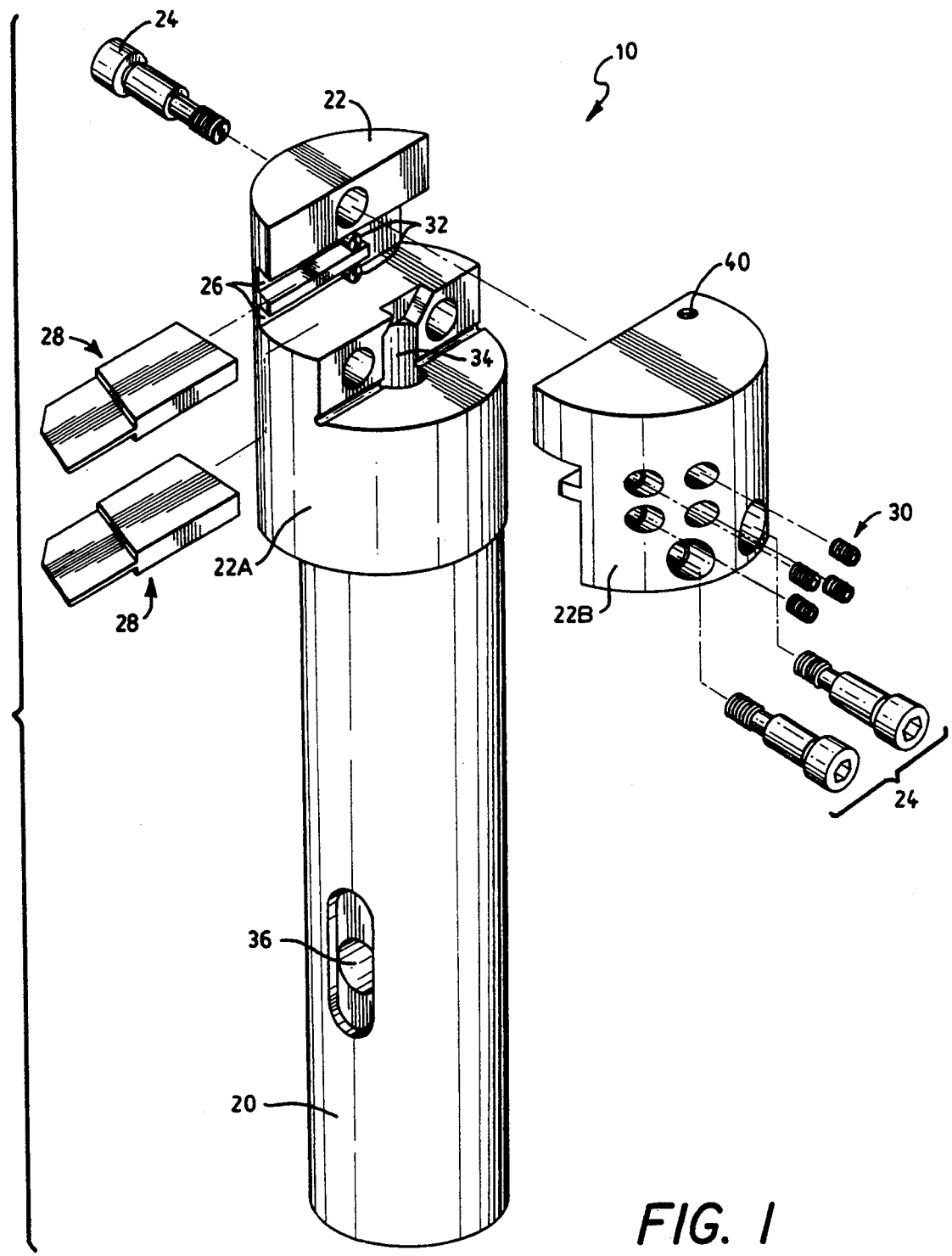
FIG. 1 is an exploded perspective view of a cutting tool.
Figure 4:
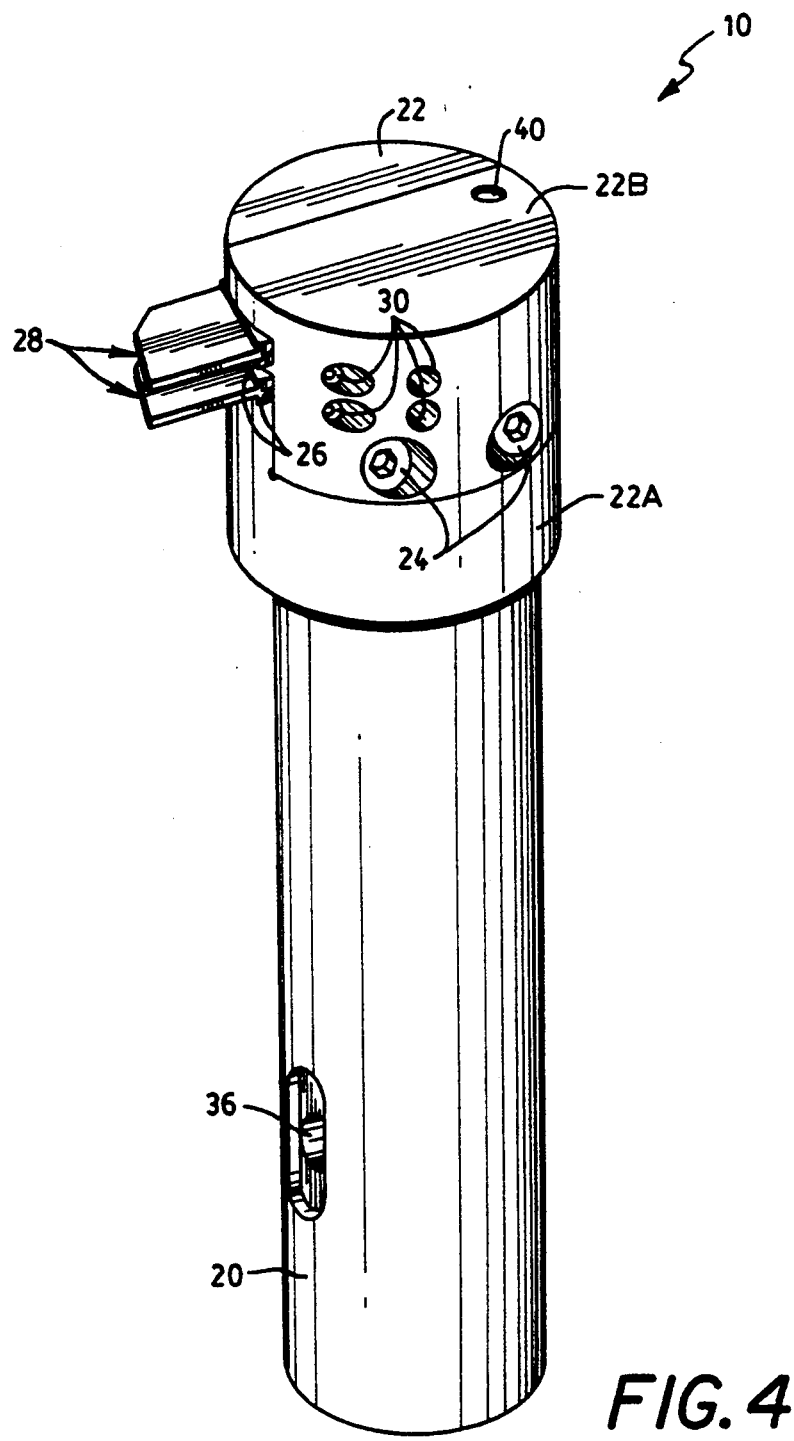
FIG. 4 is a perspective view of a fully assembled cutting tool.
Figure 5:
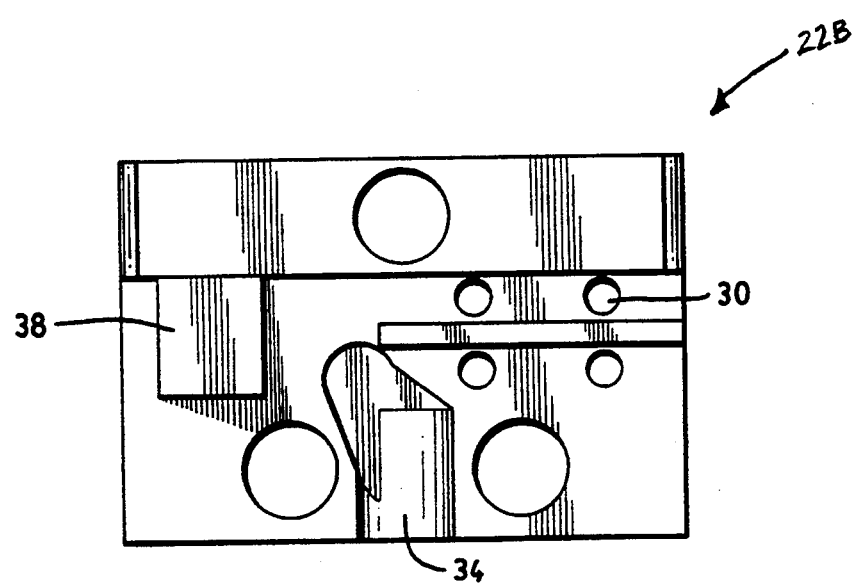
FIG. 5 is a section view of the removable portion of the cutting tool.

Referring now to the drawings with greater particularity, there is shown in FIGS. 1 and 4 a cutting tool 10 comprising a shank portion 20 and a housing portion 22. The housing portion 22 comprises a fixed portion 22A and a removable portion 22B which may be joined by joining means 24, which can be screws, pins or the like. The housing 22 when assembled defines a plurality of cutting blade cavities 26 into which cutting blades 28 may be rigidly mounted using blade mounting means 30, which can be set screws, pins or the like. The cutting blades 28 are held in the cutting blade cavities 26 at a depth which is fixed by stops 32. A coolant reservoir 34 is located within the shank 20 of the cutting tool 10. The coolant reservoir 34 runs parallel to the axis of the shank 20 and opens into the housing portion 22. Coolant dam 38 is affixed to removable housing portion 22B by set screw 40. The shank 20 has a mounting aperture 36 which can be a through or blind hole for mounting the cutting tool 10 onto a turning apparatus or the like.

Figure 2:
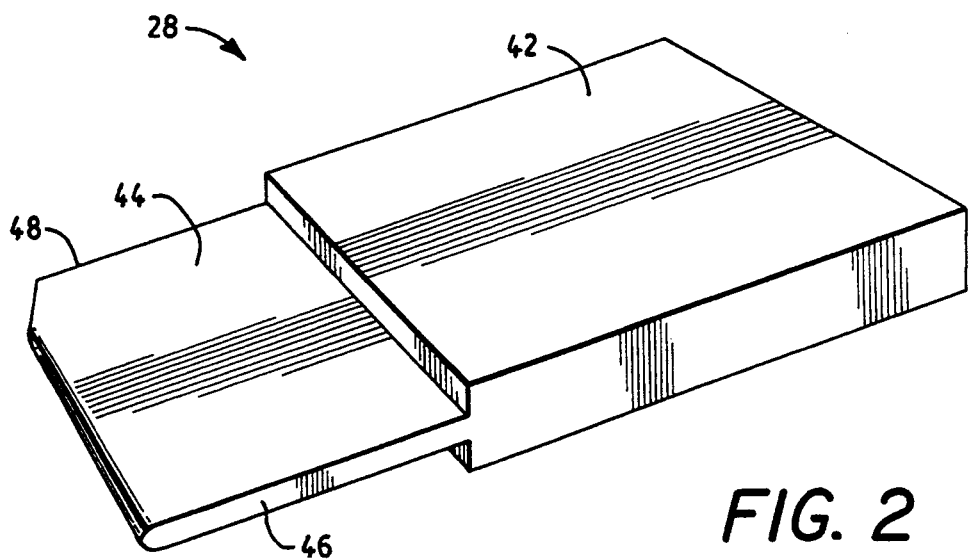
FIG. 2 is a perspective view of a cutting blade.

There is shown in FIG. 2 a cutting blade 28 which comprises an insert portion 42 and a blade portion 44. The blade portion 44 comprises a forward edge 46 and a trailing edge 48 and preferably has a depth of at least eight times its width. The insert portion 42 fits into cutting blade cavity 26 and butts against stop 32. The forward edges 46 of the cutting blades 28 being substantially coplanar as shown in FIG. 4.

Figure 3:
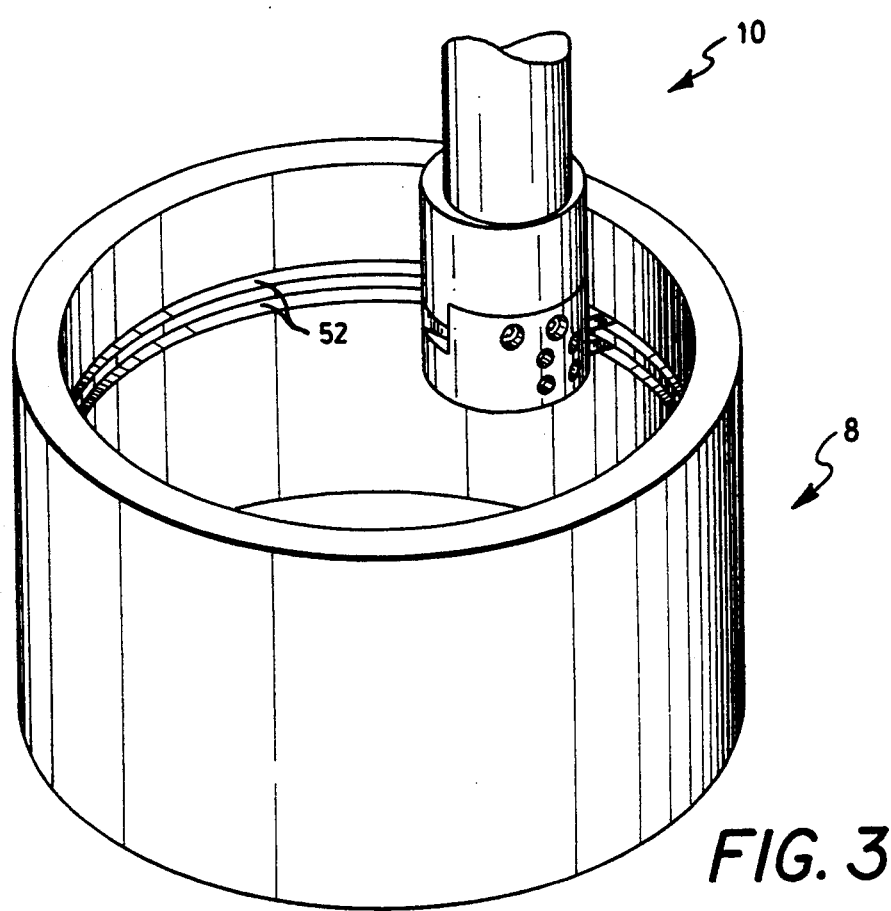
FIG. 3 is a perspective view of a cylindrical workpiece in which deep, narrow, closely spaced parallel grooves have been formed using the cutting tool and method of this invention.

The cutting tool 10 may engage a workpiece 8 as shown in FIG. 3 to produce multiple parallel deep closely spaced narrow grooves 52. The cutting tool is ideally suited for making grooves in the inside surfaces of a workpiece.

The substrate material (workpiece) to be machined may be any extremely hard, brittle material which is difficult to machine because of its brittleness. It may be pure tungsten, or tungsten alloyed with a small amount of an additive metal, such as thoria, to improve machineability. The tungsten may also be alloyed with small amounts of metal oxides, nitrides or hydrides. The tungsten or tungsten alloy may have been worked or hot isostatically pressed prior to machining.

The cutting tool may be designed to accommodate several cutting blades. The geometry of the workpiece and the desired depth of each groove in it will determine the positioning of the cutting blades relative to each other. For example, if the workpiece is in the shape of a hollow cylinder and all grooves are to be machined to the same depth, the cutting blades may be positioned to engage the workpiece to identical depths. If grooves of different depths are desired, the cutting blades may be positioned so that each blade engages the workpiece at the desired depth. If the workpiece has an angled or curved surface and the grooves are to be machined to the same depth, the cutting blades may be offset from each other to account for the irregular surface of the workpiece.

The cutting tool should preferably be made of a material which absorbs a significant portion of the shock and vibration of machining, so that the hard or brittle workpiece material does not. One preferred material is a tungsten alloy (90-93% tungsten) which additionally contains nickel and iron in a ratio of 7 parts nickel to 3 parts iron.

The cutting blade should ideally be made of a material which is sufficiently hard to cut the material to be machined. Tungsten alloys having an extremely high hardness, such as, for example, tungsten carbides, are suitable.

While there have been shown what are at present considered to be the preferred embodiments of the invention, it will be apparent to those skilled in the art that various changes and modifications can be made herein without departing from the scope of the invention as defined by the appended claims.

We claim:

1. A cutting tool for simultaneously forming a plurality of deep, narrow, closely spaced parallel grooves having a web between them in a hard, brittle material without breaking said web, the cutting tool comprising: a plurality of separable housing portions, means for rigidly joining said separable housing portions, said separable housing portions defining a plurality of closely spaced cutting blade cavities when joined, each of said cavities being configured to receive and rigidly hold a cutting blade therein, means for rigidly mounting a cutting blade in each of said cavities, and a cutting blade mounted rigidly in each of said cavities, said cutting blade having an insert portion and a narrow blade portion, said insert portion being designed to be rigidly fixed in said cutting blade cavity, said narrow blade portion having a forward edge and a trailing edge and having a depth of at least eight times its width, said forward edges of said narrow blade portions being substantially coplanar; and said separable housing portions being made of a tungsten alloy consisting essentially of 90-93% tungsten, balance nickel and iron in proportions of about 7:3 nickel:iron.

2. A cutting tool as in claim 1 wherein said cutting blade is made of a tungsten alloy.

3. A cutting tool as in claim 1 wherein said cutting blade is made of tungsten carbide.

* * * * *